(12) United States Patent
Hohner et al.

(10) Patent No.: US 10,662,867 B2
(45) Date of Patent: May 26, 2020

(54) INTERNAL COMBUSTION ENGINE

(71) Applicant: MTU FRIEDRICHSHAFEN GMBH, Friedrichshafen (DE)

(72) Inventors: Andreas Hohner, Radolfzell (DE); Konstantin Rundel, Sigmaringen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/356,034

(22) Filed: Mar. 18, 2019

(65) Prior Publication Data

US 2019/0211742 A1 Jul. 11, 2019

Related U.S. Application Data

(63) Continuation-in-part of application No. PCT/EP2017/000839, filed on Jul. 13, 2017.

(30) Foreign Application Priority Data

Sep. 23, 2016 (DE) .......................... 10 2016 011 551

(51) Int. Cl.
| | |
|---|---|
| *F02B 37/007* | (2006.01) |
| *F02B 37/12* | (2006.01) |
| *F04D 27/02* | (2006.01) |
| *F02B 37/22* | (2006.01) |

(52) U.S. Cl.
CPC .......... *F02B 37/007* (2013.01); *F02B 37/12* (2013.01); *F02B 37/225* (2013.01); *F04D 27/0253* (2013.01); *F04D 27/0269* (2013.01); *F02B 2037/122* (2013.01); *F02B 2037/125* (2013.01); *Y02T 10/144* (2013.01)

(58) Field of Classification Search
CPC .... F02B 37/007; F02B 37/001; F02B 37/002; F02B 37/22; F02B 37/225; F02B 2037/122; F02B 2037/125; F04D 27/0253; F04D 27/0269; F01M 11/02; F01M 2011/027–028
USPC ...... 60/600, 602, 611, 612, 608, 609, 605.3; 123/562; 184/6.16
See application file for complete search history.

(56) References Cited

U.S. PATENT DOCUMENTS

| | | | | |
|---|---|---|---|---|
| 4,228,655 | A | * 10/1980 | Herschmann | ........... F02B 37/00 251/129.1 |
| 4,418,536 | A | * 12/1983 | Deutschmann | ....... F02B 37/007 60/602 |
| 4,560,319 | A | 12/1985 | Blotenberg | |

(Continued)

FOREIGN PATENT DOCUMENTS

DE 188 16 840 C2 10/1999

*Primary Examiner* — Mark A Laurenzi
*Assistant Examiner* — Mickey H France
(74) *Attorney, Agent, or Firm* — Klaus J. Bach

(57) ABSTRACT

In an internal combustion engine with exhaust gas turbochargers which operate in parallel and of which at least one can be switched on and off by a charge air duct blocking arrangement including a charge air duct blocking element, the charge air duct blocking arrangement is adapted to provide for a certain movement characteristic of the charge air duct blocking element resulting in a slower movement of the charge air duct blocking element resulting in a longer duration for the air duct blocking element to reach its open position and a faster movement during closing resulting in a rapid closing of the charge air duct blocking element.

13 Claims, 4 Drawing Sheets

(56) References Cited

U.S. PATENT DOCUMENTS

| | | | | |
|---|---|---|---|---|
| 5,284,120 A * | 2/1994 | Fukushima | ............ | G01F 9/001 |
| | | | | 123/497 |
| 6,158,219 A * | 12/2000 | Mailander | ............ | F02B 37/007 |
| | | | | 60/606 |
| 6,279,320 B1 * | 8/2001 | Mailander | ............ | F02B 37/002 |
| | | | | 60/612 |
| 6,966,183 B2 * | 11/2005 | Mailander | ............ | F02B 37/007 |
| | | | | 60/612 |
| 2006/0059908 A1 * | 3/2006 | Schorn | ................. | F02B 37/001 |
| | | | | 60/599 |
| 2008/0256951 A1 * | 10/2008 | Delavan | ............... | F02B 37/001 |
| | | | | 60/624 |
| 2009/0287397 A1 * | 11/2009 | Massard | ............ | F02D 13/0246 |
| | | | | 701/105 |
| 2010/0281862 A1 * | 11/2010 | Shiraishi | ............... | F02B 37/001 |
| | | | | 60/600 |
| 2011/0146634 A1 | 6/2011 | Iwatani | | |
| 2011/0197593 A1 | 8/2011 | Fuchs | | |
| 2011/0265454 A1 * | 11/2011 | Smith | ................... | F01N 3/0842 |
| | | | | 60/274 |
| 2011/0265771 A1 * | 11/2011 | Banker | ................ | F01N 3/0814 |
| | | | | 123/564 |
| 2015/0308442 A1 | 10/2015 | Glove | | |
| 2016/0369717 A1 * | 12/2016 | Brinkmann | ......... | F02D 41/0007 |
| 2017/0335754 A1 * | 11/2017 | Xiao | ...................... | F02B 37/18 |

\* cited by examiner

INTERNAL COMBUSTION ENGINE

This is a continuation-in-part application of pending international patent application PCT/EP2017/000839 filed Jul. 13, 2017 and claiming the priority of German patent Application No. 10 2016 011551.3 filed Sep. 23, 2016.

BACKGROUND OF THE INVENTION

The present invention resides in an internal combustion engine with turbo chargers which operate in parallel relationship and of which one includes a charge air duct blocking arrangement with a charge air duct blocking element which can be controllably actuated to block or unblock the charge air duct.

In the state of the art, similar internal combustion engines are known wherein, for an air increase of the engine torque, in particular of charged Diesel engines, a register switching arrangement is used as disclosed for example in the printed publication DE 198 16840C2.

Herein with an increase in the power requirements, a further exhaust gas turbo charger is activated in addition to a base turbo charger. Upon activation of the further exhaust gas turbo charger, it may happen, depending on the engine operating state, that the speed of the accelerated further charger exceeds shortly the speed of the base turbo charger. This may cause a low pressure in the flap valve housing upstream of the further charger running at an excessive speed whereby the air control flap in the charge air supply duct to the further charger is opened. And since the speed of the further charger at this point exceeds the speed of the base charger, the supply air flow via the further charger is, at the same pressure difference, greater than the air supply flow provided by the base charger. With this asymmetric set up, the operating point of the base charger is beyond the pumping limit so that, immediately after the switching procedure, an excessive charger pumping may occur.

Based hereon it is the object of the present invention to provide an internal combustion engine of the type referred to above, which overcomes the disadvantages of the state of the art.

SUMMARY OF THE INVENTION

In an internal combustion engine with at least two exhaust gas turbochargers which operate in parallel and of which at least one can be switched on and off by a charge air duct blocking arrangement including a charge air duct blocking element, the charge air duct blocking arrangement is adapted to provide for a certain movement characteristic of the charge air duct blocking element resulting in a slower movement of the air duct blocking element with a longer duration for the air duct blocking element to reach its open position and a faster movement during closing resulting in a rapid movement of the charge air duct blocking element to its closed position.

The internal combustion engine according to the present invention is preferably in the form of a piston engine, particularly an auto-ignition engine such as a diesel engine, and especially for a large vehicle such as a ship or lock or a commercial or a specialty vehicle. Such an engine may also be used for stationary applications, for example, a city block heating and power generation installation or an emergency power generator for example also for industrial applications.

The internal combustion engine is provided with at least two turbochargers which are arranged in parallel and of which one can be switched on and off via a charge air duct blocking device including a blocking element, that is the charger which is switchable. The switchable charger may be activated when needed to deliver more power and switched off when no longer needed. In particular the switchable charger is activated only when the internal combustion engine is operated under full power whereas the base turbocharger is preferable also activated when the internal combustion engine operates only under partial load. For the activation of the further turbocharger the exhaust gas duct blocking device, for example a flap or a valve in the exhaust gas duct to the turbine of the switchable charger, can be opened, so that the turbine with the associated compressor is activated. For a shutdown of the further turbocharger, the exhaust gas duct blocking device may again be returned to a blocking position.

Together with the activation of the turbine and its speed increase (upon opening of the exhaust gas duct blocking device) the charge air flow duct to the compressor of the switchable turbocharger may be opened, whereby the switchable turbocharger reaches the charge air compressing operating state that is its fully activated state.

In accordance with the present invention the charge air duct blocking device is designed to follow a predetermined movement characteristic which provides for a longer period for the charge air blocking element to reach its open position than it takes for the blocking element to reach its closed position. An opening period or, respectively, closing period in accordance with the invention is meant to be the duration which the blocking element requires with a certain predetermined movement characteristic to move from the closed position to the fully open position, or respectively, from the fully open position to the closed position.

With the present invention it has become possible to avoid in a simple manner a charger pumping by an adjustment of a predetermined movement characteristic of the charge air blocking element which provides for a certain slow opening thereof. With the slow opening provided by the predetermined movement characteristic, it is advantageously avoided that the air supply flow of the base charger becomes smaller too rapidly so that the base charger can advantageously always be operated below the pumping limit when the further turbocharger is activated.

In particular, in connection with arrangements according to the present invention wherein the charge air duct blocking element movement is obtained by a pressure differential (vacuum activated) for its opening the slow opening can be achieved by an active delay in an opening control arrangement via a suitable charge air duct blocking arrangement. On the other hand, it may also be provided by the control arrangement that the closing movement of the charge air duct blocking element is not slowed down.

Generally, in connection with the present invention, the charge air duct blocking element is in the form of a charge air flap but also for example in the form of a slide or rotational control element.

In a further embodiment, the internal combustion engine may have a charge air duct blocking device with a predetermined movement characteristic which is adjustable depending on the engine operating state. Herein the charge air duct blocking device may include for example a special control arrangement or it may cooperate with a control arrangement of for example an engine control unit (ECU) whereby preferable a software and/or sensor based control of the charge air duct blocking element is facilitated (which takes in particular engine operating data into consideration). With such embodiments for example, in addition to a slow opening and a fast closing of the blocking element, settings with shorter opening durations can be implemented whenever this is advantageous based on the engine operating state. In this way the activation procedure for the further turbocharger can be shortened when this is possible. Such a charge air duct blocking arrangement can be adjusted to provide for an opening characteristic with a relatively fast or a relatively slow opening movement of the charge air blocking element within the defined movement characteristic.

Advantageously, a charge air duct blocking arrangement of the internal combustion engine according to the invention may also be designed to have at least one predetermined partial opening position of the charge air duct blocking element which can be maintained over a certain period that is it may have discrete intermediate positions between the closed and the fully open positions. Such a partial opening position may be selected for example independently of a movement characteristic of the charge air duct blocking element with the relatively slow opening procedure and the relatively fast closing procedure or it may be adjusted within the framework thereof, in particular in connection with a multi-step opening of the charge air duct blocking element. Preferably, the control arrangement of the internal combustion engine is such that the charge air duct blocking element that is its opening speed as well as the positions thereof during an opening or also a closing procedure and in particular during a partial opening procedure can be actively influenced or, respectively, controlled. Preferably also such a control occurs depending on the operating state of the internal combustion engine.

In accordance with a preferred embodiment of the internal combustion engine, the charge air duct blocking arrangement can be designed for a hydraulic control of the charge air duct blocking element. In this case, the charge air blocking arrangement may simply have a hydraulic control fluid supply line with a relatively small flow cross section for the opening of the charge air blocking element providing for a relatively slow opening movement (or with a relatively small throttling cross section for the release of the hydraulic fluid from a control cylinder of a control arrangement which is in an operative connection with the charger air duct blocking element) and a control fluid line with a larger hydraulic fluid flow cross section for a faster closing of the charger air duct blocking element (provided particularly in the hydraulic fluid supply line to the control cylinder of the charger air duct blocking arrangement).

In actual set-ups of this type, the hydraulic fluid flow connection between the charge air duct blocking arrangement and the control cylinder mentioned above may be provided by a hydraulic fluid line with a relatively small cross-section and a hydraulic fluid line with a larger cross-section. Herein the smaller cross-section may be established in particular by a throttling flow restrictor arranged in a line via which hydraulic fluid is released from the control cylinder whereas the larger flow cross-section is provided by a by-pass line to the throttling restrictor which by-pass line supplies hydraulic fluid to the control cylinder and which includes a check valve. Such a functionality may be achieved in a simple manner by a unit such as two (concentrically) arranged conical valves wherein the inner valve includes a throttle structure. Furthermore, in the above solution, it is also possible to make the smaller flow cross-section variable for example by the use of an adjustable throttling arrangement or diaphragm so that different valve closing times for the charge air blocking element can be adjusted.

As hydraulic operating fluid for the charge air blocking device, for example oil in particular engine oil, may be used which is circulated under pressure in a transmission or, respectively, an internal combustion engine oil circuit.

In alternative embodiments of the internal combustion, which also employ a hydraulic charge air blocking arrangement, the hydraulic control fluid may be released selectively via a smaller hydraulic fluid flow cross-section (with a throttling effect) or a larger hydraulic fluid flow cross-section (in particular with no throttling effect) for a relatively slow opening or, respectively, a relatively fast closing of the charge air blocking element by a control cylinder-piston device as mentioned earlier. To this end, the charge air blocking arrangement may include a directional valve, preferable a 3/2-way valve, via which the hydraulic fluid can be controllably released (from the control cylinder-piston device for the charge air duct blocking element) depending on the position of the 3/2-way valve via the smaller flow cross-section for a relatively slow opening (a relatively large duration for reaching the fully open position), or via the relatively large flow cross-section for a relatively fast opening (a relatively short duration for reaching the fully open position). Also in this way, an advantageously high flexibility in activating the further turbocharger is obtained, wherein again also the fast closing of the charge air duct blocking element can be provided for.

Also included in the present invention is the design of an internal combustion engine provided with a charge air duct blocking arrangement for opening and closing the charge air duct blocking element with the intended movement characteristics. Herein the charge air duct blocking arrangement may include an electric controller which is operatively connected to the charge air duct blocking element for the opening and closing thereof with the desired movement characteristics, in particular a control arrangement such as an ECU associated with the internal combustion engine. Preferably, such a controller is adapted to provide for different opening speeds, that is variable opening periods and/or positions, for example intermediate positions, of the charge air duct blocking element within the opening procedure, in particular an engine operating state dependent movement characteristic. Such a movement characteristic may be software based or based on a performance graph.

In a further embodiment of the invention, the internal combustion engine may include for example a charge air duct blocking arrangement with a hydraulic control cylinder which is operatively connected to the charge air duct blocking element and is provided with a position control of the piston of the control cylinder, in particular a proportional valve and a travel distance measurement device which facilitates, in an operative connection with the control cylinder, a predetermined opening control of the charge air duct blocking element with different opening speeds and positions, in particular the adjustment of an engine operating point-dependent opening characteristic. In this way also arrangements with a hydraulic control can be operated with high accuracy and variability.

In general, the present invention provides for a charge air duct blocking arrangement with a ratio of an opening duration of the charge air duct blocking element to a closing duration of the blocking element in the range of 5:1 to 20:1. A ratio of for example 10:1 is preferred. Furthermore, the internal combustion engine is preferably provided with a charge air duct blocking arrangement with an opening characteristic wherein the charge air duct blocking element is opened continuously, that is steplessly over the full opening distance up to the fully open position.

Further features and advantages of the invention will become apparent from the following description of exemplary embodiments of the invention with reference to the accompanying drawings. The various features can be used individually of implemented in combination for a realization of the invention.

Preferred embodiments of the invention will be described below with reference to the accompanying drawings.

DETAILED DESCRIPTION OF THE PREFERRED EMBODIMENT

Figure 1:
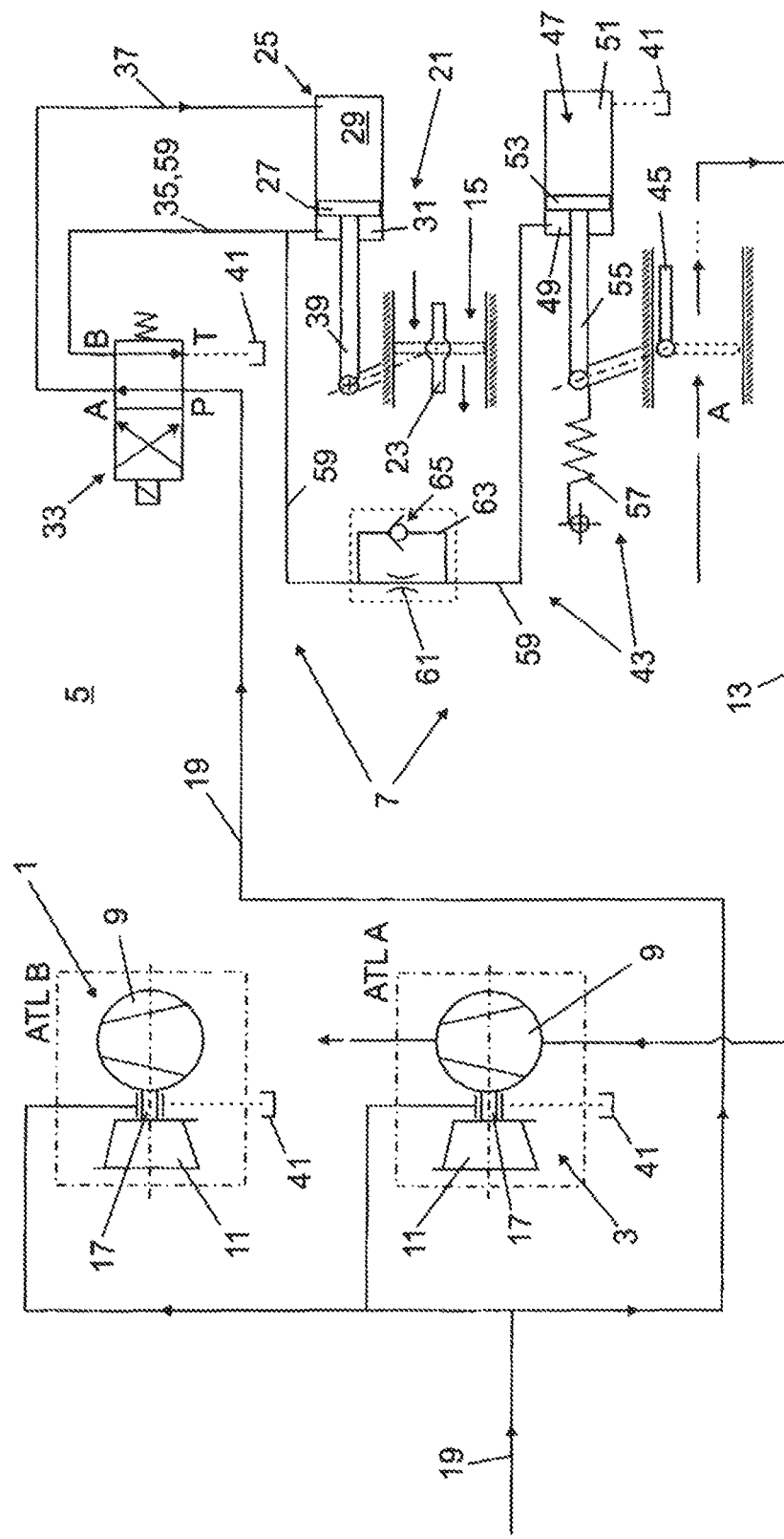
FIG. 1 shows schematically, in an exemplary representation, exhaust gas turbochargers of an internal combustion engine and an activating arrangement for one of the exhaust gas turbochargers in a particular embodiment of the invention.

In the following description and in the drawings identical elements with the same or similar functions are designated by the same reference numerals.

FIG. 1 shows, in an exemplary view, two exhaust gas turbochargers 1, 3 arranged in parallel of an internal combustion engine 5, that is a base charger 1 and an activatable or deactivatable exhaust gas turbocharger 3 as well as an activation and deactivation arrangement 7 by which the activatable turbocharger 3 can be activated or deactivated.

A respective exhaust gas turbocharger 1, 3 comprises, in a well known manner, a compressor part (compressor wheel) 9 and a turbine part (turbine wheel) 11. The compressor part 9 is arranged in a charge air duct 13 of the internal combustion engine (shown in the Figures in an exemplary manner only for the activatable turbocharger 3) whereas the turbine part 11 is arranged in an exhaust gas duct 15.

The bearings of the turbochargers 1, 3, that is their shafts 17, are included in an engine oil circuit or hydraulic circuit 19 of the internal combustion engine 5 which oil—or hydraulic fluid circuit 19—provides for the motor oil or respectively the hydraulic fluid for the activation arrangement by which the exhaust gas turbocharger 3 can be hydraulically activated and deactivated. The hydraulic circuit 19 is supplied with pressured hydraulic fluid by an engine-driven oil pump of the internal combustion engine 5.

The activation arrangement 7 includes for the activation and the deactivation of the exhaust gas turbocharger 3 an exhaust gas duct blocking arrangement 21 with an exhaust gas duct blocking element 23 which is in the form of a control flap pivotally arranged in the exhaust gas duct 15. For the control of the exhaust gas duct blocking element 23 the exhaust gas duct blocking arrangement 21 includes a hydraulically operated control cylinder 25 in operative connection with the exhaust gas duct blocking element 23 whose two cylinder chambers 29, 31, which are separated by a piston 27, can be alternatively pressurized or, respectively, depressurized via a 4/2 way valve or a control valve 33 arranged in the hydraulic circuit 19 (and the respective duct sections 35, 37) depending on the valve setting.

In a position of the control valve 33 as shown in FIG. 1, the piston 27 of the control cylinder 25 is moved to the left by the in-flow of pressurized hydraulic control fluid admitted to the right-side cylinder chamber 29 and the release of the control fluid from the left side cylinder chamber 31 so that the exhaust gas duct blocking element 23 is moved by the elbow lever 39 which is connected to the piston 27 to its open position. When, on the other hand, the valve 33 is moved to its other position (not shown) the piston 27 is moved to the right as now the left cylinder chamber 31 is pressurized while the hydraulic fluid is released from the right cylinder chamber 29. As a result, the exhaust gas duct blocking element 23 is moved by the piston 27 via the elbow lever 39 to its closed position so that the supply of exhaust gas to the turbine of the exhaust gas turbocharger 3 is interrupted that is the exhaust gas turbocharger 3 is shut down. The hydraulic fluid released from the control cylinder 25 may be collected in a reservoir such as a tank 41.

As further shown in FIG. 1, the activation arrangement 7 comprises also a charge air duct blocking arrangement 43 with a charge air duct blocking element 45. The charge air duct blocking arrangement 43 also includes a hydraulic control cylinder 47 which also includes two cylinder chambers 49, 51 which are separated by a piston 53 that is movably disposed in the cylinder 47. In contrast to the control cylinder 25 of the exhaust gas duct blocking arrangement 21, hydraulic control fluid can be admitted only to one of the cylinder chambers, that is the chamber 49.

The piston 53 is operatively connected to the charge air duct blocking element 45 which, as shown in the Figure, is an air flap which is supported so as to be pivotable between an open and a closed position (shown in a dotted line). The elbow lever 55 or, respectively, the piston rod part thereof is further engaged by a tension spring 57 ensuring a reliable opening of the charge air duct blocking element 45.

The charge air blocking element or flap 45 arranged in the charge air duct 13 upstream of the compressor 9 of the exhaust gas turbocharger 3 controls the intake air flow (arrow A) from an air filter (not shown) to the air compressor 9 and is subjected to a pressure differential when the compressor wheel of the further exhaust gas turbocharger, that is the turbocharger 3, is activated, which pressure differential causes the flap 45 to open. To permit the opening of the flap 45, the hydraulic pressure fluid (oil) in the chamber 49 of the control cylinder 47 needs to be released from the cylinder chamber 49. This is possible with the control valve 33 arranged in the position as shown in FIG. 1 in which position the hydraulic fluid can flow out of the cylinder chamber 49 and, via the drain line 59 to the tank 41. During the release of the pressurized fluid from the chamber 49, the piston 53 moves under the tension force of the spring 57 together with the elbow lever 35, to the left thereby opening the charger air flow control flap 45.

The speed of movement of the control flap 45 is controlled by the movement of the piston 53 in the control cylinder 47 that is the release of the hydraulic fluid from the chamber 49 via the hydraulic fluid flow connection 59 to the tank 41. For closing the charge air duct blocking flap 45, hydraulic pressure fluid is again admitted by a switchover of the control valve 33 so that hydraulic pressure fluid is supplied from the valve 33 via the duct section 35 and the hydraulic fluid flow connection 59 to the chamber 49 of the cylinder 47, whereby the piston 53 is moved by the elbow lever 55 to the right and the flap 45 is closed.

This in accordance with the invention provides for a charge air duct blocking arrangement 43 closing with a predetermined movement characteristic of the charge air duct blocking element 45 which is adjustable and which has a relatively slow opening speed and a comparably fast closing speed. With this set-up, a charger pumping can be effectively avoided since the air flow through the exhaust gas turbocharger 3 increases relatively slowly, that is not suddenly, so that the base charger 1 can maintain its air flow rate.

For the adjustment, that is the establishment of the predetermined movement characteristic, the hydraulic fluid flow connection 59 to the control cylinder 47 of the charge air duct 43 includes a throttling device 61 with a by-pass 63 as shown in FIG. 1. The by-pass 63 includes further a check valve 65. This arrangement provides for a relatively small flow cross-section in the fluid flow connection 53 for the control fluid released from the control cylinder 47 of the charge air duct blocking arrangement 43 during opening of the air flap 45 as the by-pass 63 is blocked by the check valve 65 so that the control fluid must pass through the throttling device 61. In this way, the desired relatively slow opening of the intake air flap 45 is achieved as the drainage of the hydraulic control fluid is inhibited that is slowed resulting in a slow displacement of the piston 55, the elbow lever 55 and the opening of the air flap 45.

With the closing of the intake air flap 45 upon switching over the control valve 33 for directing hydraulic control fluid to the control cylinder 47, the check valve 65 in the by-pass 63 is opened providing for a large flow cross-section bypassing the throttle 61 and an undelayed movement of the piston 53 in the control cylinder 47 to the right resulting in a rapid closing of the intake air flap 45.

In an advantageous further development of this arrangement which can be realized in a simple and inexpensive way, the throttle 61 may have an adjustable cross-section whereby the opening characteristic of the intake air flap can be adjusted for an adjustment of the flap opening speed that is the duration of the flap opening process. In the arrangement of FIG. 1 furthermore, a safety valve may be provided which safety valve protects the further exhaust gas turbocharger 3 from over-speeding. Such a safety valve could be arranged for example in the hydraulic fluid flow connection so as to be opened for discharging fluid depending on the pressure ahead of the charger 3 (the admissible low pressure corresponds in particular to the charger speed limit minus a safety margin).

Figure 2:
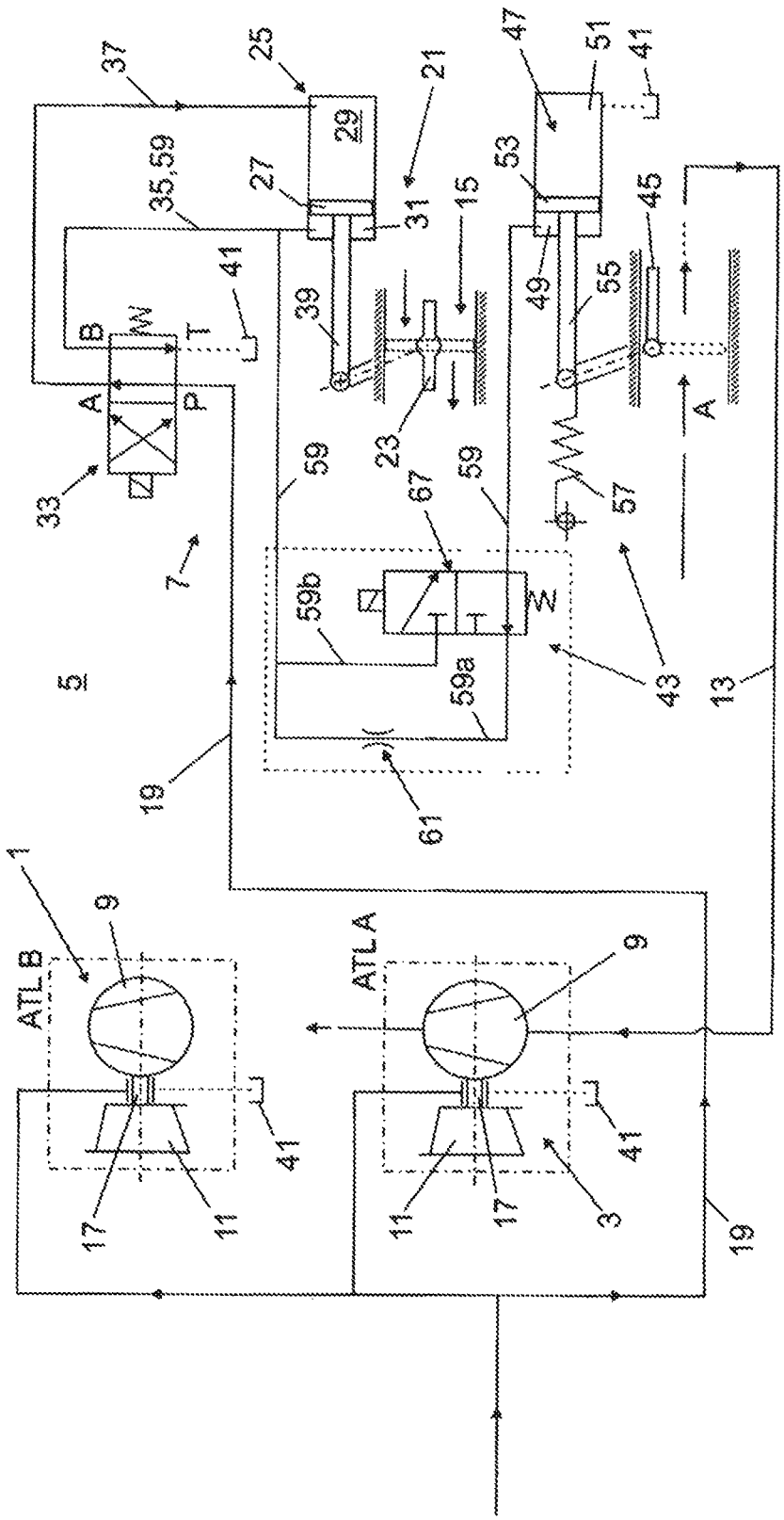
FIG. 2 shows, in an exemplary view similar to FIG. 1, another preferred embodiment of the invention.

FIG. 2 shows another embodiment of the internal combustion engine 5 according to the invention, that is, more specifically, it is focused on the activation arrangement 7 and the exhaust gas turbocharger 1 or, respectively, 3, wherein, different from the above-described embodiment in the charge air duct blocking arrangement 43, the hydraulic fluid is selectively conducted through a smaller or a greater hydraulic fluid flow cross-section for a relatively fast opening or, respectively, a relatively slow opening of the charge air duct blocking element 45.

Herein, the charge air duct blocking arrangement 43 includes a valve 67, in particular a 3/2 way valve, by which a fluid flow connection 59 of the control valve 33 with the control cylinder 47 is switched via a first line section 59*a* including a small flow cross-section or the flow connection 58 may be established via a second line section 59*b* with a larger flow cross-section. To provide for the smaller flow cross section in the first line section 59*a*, the first line section 59*a* includes the throttling element 61, whereas the second line section 59*b* includes no throttling means that is it has a relatively large flow cross-section for a fast closing of the blocking element 45.

In the position of the valves 33, 67 as shown in FIG. 2 pressurized control fluid is released from the control cylinder 47 via the first line section 59*a*, that is its flow is throttled by the throttle 61 so that the charge air duct blocking element 45 is opened slowly. If, on the other hand, depending on the operating state of the engine, the charge air blocking element 45 is to be opened rapidly, the valve 67 can be moved to a position (not shown) in which the control fluid can be drained from the control cylinder 47 unthrottled via the line section 59*b*. In this position of the valve 67, the charge air duct blocking element 45 can also be rapidly closed so that, for a fast closing of the charge air blocking element, only the control valve 33 needs to be switched. With this solution, a slow opening characteristic of the charge air blocking element 45 can be obtained when necessary to avoid charger pumping whereas, in all other operating states, the charge air blocking element 45 can be opened rapidly that is the further exhaust gas turbocharger can be activated rapidly. In this configuration, the charge air blocking arrangement 43 is suitable for use in combination with an engine operating state-based software control of the control valve 33 and also the valve 67.

Figure 3:
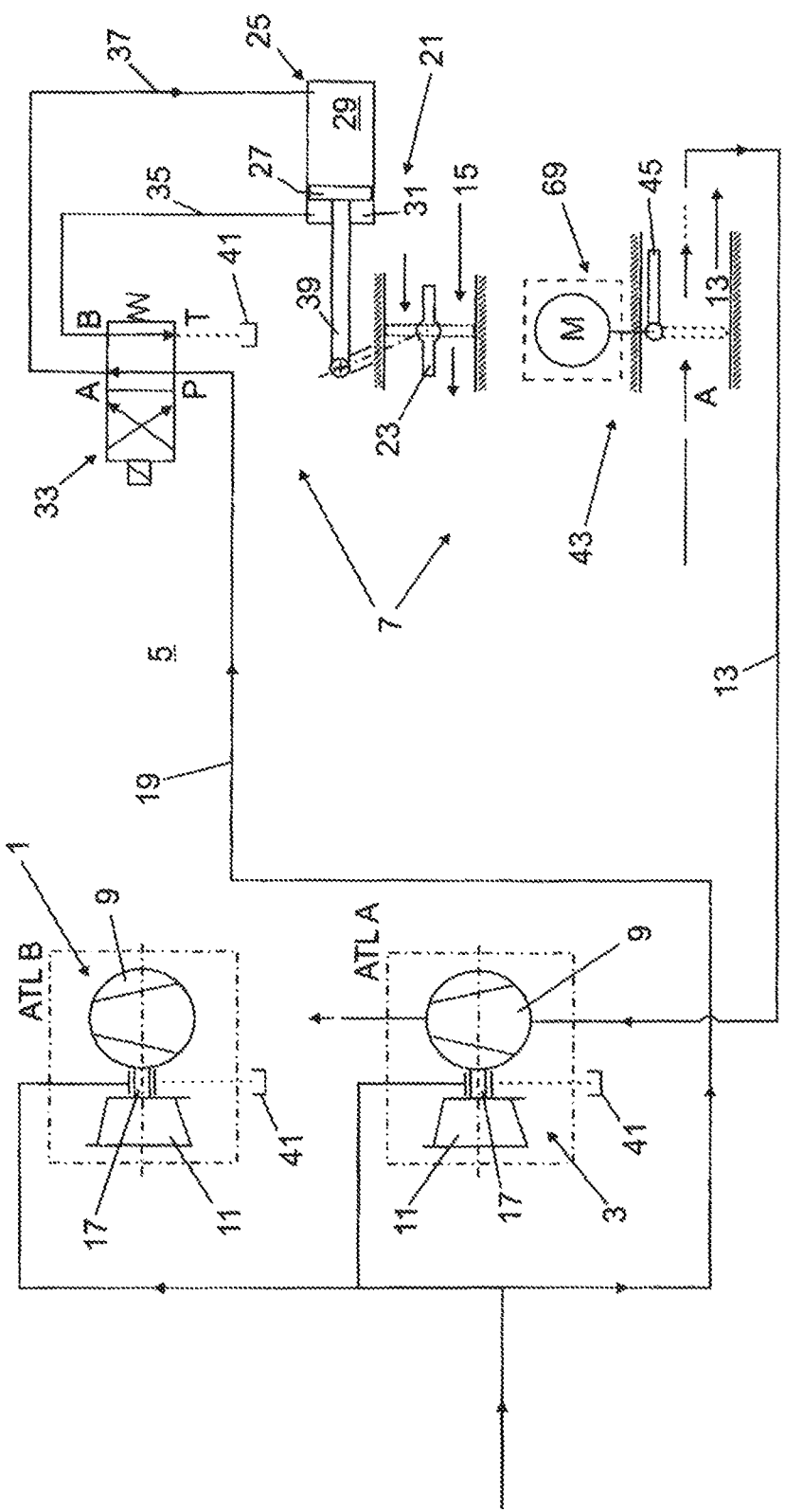
FIG. 3 shows, in an exemplary view similar to FIGS. 1 and 2 an additional preferred embodiment of the invention.

FIG. 3 shows an activation arrangement 7 for the further turbocharger 3 wherein—different from the embodiments described above—the charge air duct blocking arrangement 43 includes, in place of the hydraulic control, an electric control of the charge air duct blocking element 45 for obtaining the desired movement characteristic.

To this end, the charge air duct blocking arrangement 43 is provided with an electric control motor or respectively, a controller 69 by which the charge air duct control flap 45 can be opened or closed at different speeds, in particular with different opening speeds. With such an arrangement the controller 69 may advantageously also provide for intermediate positions of the charge air blocking element 45, that is partially open positions or a multi-stage opening profile resulting in a still greater variability. Also in connection with this embodiment of the invention, the charge air duct blocking element 45 is adjusted preferably dependent on the operating state of the internal combustion engine that is by a suitable implementation of control programs of the control software of the charge air duct control arrangement 43 controlling the controller 69.

Figure 4:
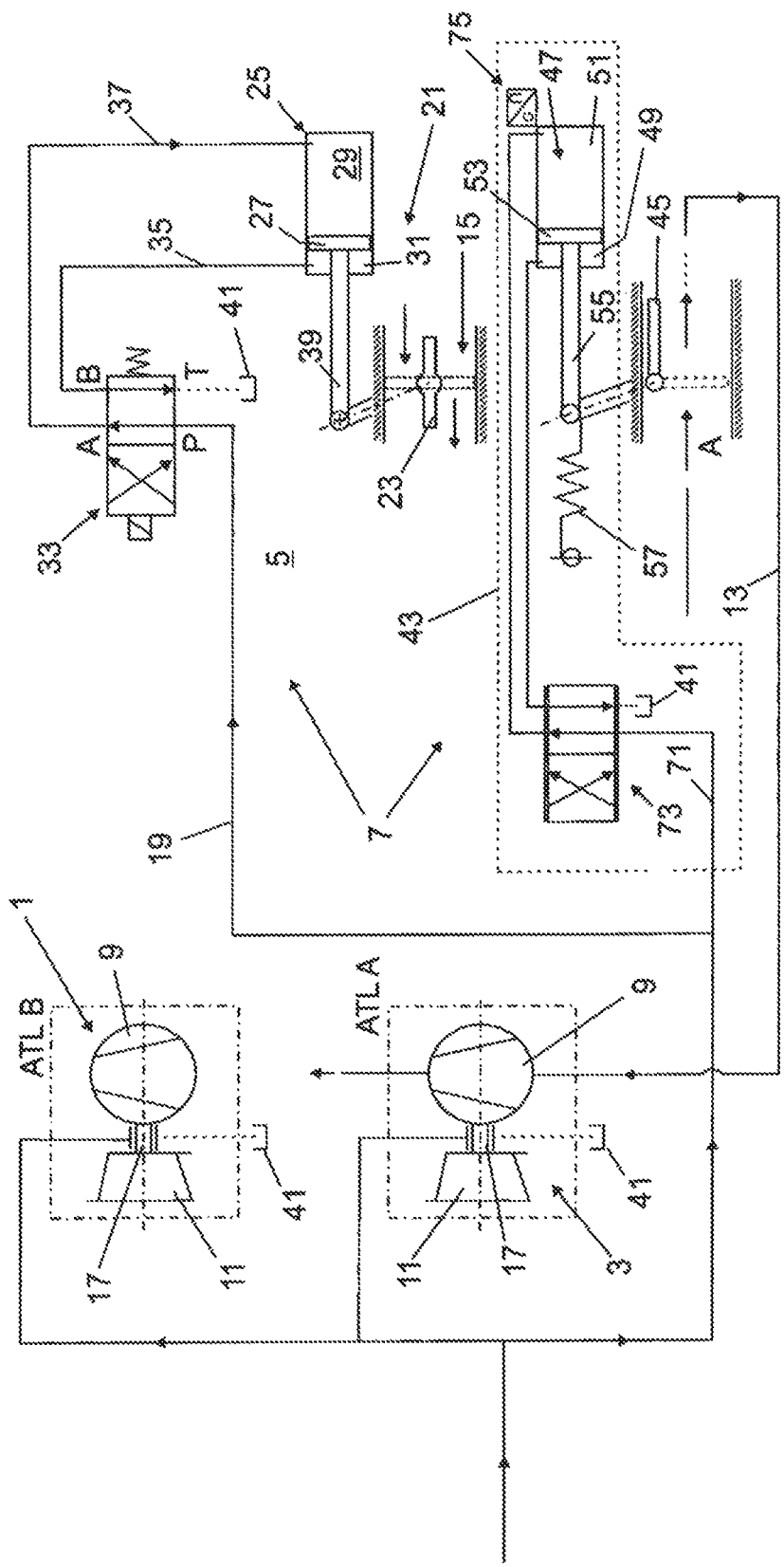
FIG. 4 shows in an exemplary view similar to FIGS. 1, 2 and 3, a further preferred embodiment of the invention.

FIG. 4 shows a further activation arrangement for the turbocharger 3 of the internal combustion engine 5, wherein the charge air duct blocking arrangement 43 is operated hydraulically but also provides for highly variable adjustment capability of the opening characteristic of the blocking arrangement 43. The charge air duct blocking arrangement according to FIG. 4 again comprises a hydraulic control cylinder 7 which is operatively connected to the charge air duct blocking element 45 for the control thereof. However, contrary to the hydraulic control arrangements of the air flow control flaps 45 of FIGS. 1 and 2, the charge air duct blocking arrangement 43 includes a hydraulic control circuit 71 which is separate from the control for the hydraulic control circuit for the exhaust gas, but which also uses hydraulic fluid or oil from the internal combustion engine oil circuit.

The control cylinder 47, which in this embodiment, includes two hydraulically controllable chambers 49, 51 is provided with a proportional valve 73, in particular a 4/2 way proportional valve as well as a travel distance measuring arrangement 75, which in an operative connection with the control cylinder 47, facilitates a predetermined opening control of the charge air duct blocking element 45 with different opening speeds and positions. With such an arrangement, in particular in combination with a control of the proportional valve 73 by means of an engine control unit (ECU), the charge air duct blocking element 45 can be opened for the addition of the exhaust gas turbocharger 3 over a predetermined travel distance and with a predetermined opening speed. As control signal, for example a PWM (pulse-width-modulated) signal may be used. With such an arrangement advantageously also a multi-step opening of the charge air duct blocking element is made possible for example with, or in addition to, the movement characteristic with a relatively slow opening speed. In connection with a multi-step valve opening with predetermined blocking element positions, the air flow volume through the compressor 9 can be adjusted independently of the opening speed.

Generally, it is the object of the present invention to provide with the charge air duct blocking arrangement 43 a blocking element movement characteristic with an opening movement duration for the charge air blocking element 46 which is 5 to 20 times as long as the time it takes to close the valve. It is also possible to provide with a charge air duct blocking arrangement 43 according to the invention a valve opening characteristic with which the charge air blocking element follows a pre-set movement over the duration of the opening or, respectively, the whole opening travel distance.

The charge air duct blocking element 43 may also be arranged at the pressure site of the compressors 9 of the exhaust gas turbocharger 3.

LIST OF REFERENCE NUMERALS 1 exhaust gas turbocharger (base charger)
3 exhaust gas turbocharger (switchable charger)
5 internal combustion engine
7 activation arrangement
9 compressor part
11 turbine part
13 charge air duct
15 exhaust gas duct
17 shaft
19 hydraulic circuit
21 exhaust gas duct blocking arrangement
23 exhaust gas duct blocking element
25 control cylinder (of the exhaust gas duct blocking arrangement)
27 piston
29 cylinder chamber
31 cylinder chamber
33 control valve
35 duct section
37 duct section
39 elbow lever
41 reservoir, tank
43 charge air duct blocking arrangement
45 charge air duct blocking element
47 control cylinder (of the charge air duct blocking arrangement)
49 chamber
51 chamber
53 piston
55 elbow lever
57 tension spring
59 hydraulic fluid flow connection
59a first line section
59b second line section
61 throttling device
63 by-pass
65 check valve 67 valve
69 controller
71 hydraulic control circuit
73 proportional valve
75 travel distance measuring arrangement
A intake air

What is claimed is:

1. An internal combustion engine (5) including exhaust gas turbochargers (1, 3) which operate in parallel and one of which can be switched on and off by exhaust gas duct blocking arrangement (21) and a charge air blocking arrangement (43) including a charge air duct blocking element (45), the charge air duct blocking arrangement (43) being adapted to follow a predefined movement characteristic of the charge air duct blocking element (45) which provides for a longer duration for the opening of the air duct blocking element (45) than for the closing thereof.

2. The internal combustion engine (5) according to claim 1, wherein the charge air duct blocking arrangement (43) is adapted to perform either one of actively slowing down the opening of the charge air duct blocking element (45) and not slowing the charge air duct blocking element (45) during the closing thereof.

3. The internal combustion engine (5) according to claim 1, wherein the charge air duct blocking arrangement (43) is designed to provide, within the frame of the predefined movement characteristic, an engine operating state-dependent opening characteristic of the charge air duct blocking element (45).

4. The internal combustion engine (5) according to claim 1, wherein the charge air duct blocking arrangement (43) is adapted to adjust, within the frame work of the predefined movement characteristic, an opening characteristic with a relatively shorter or a relatively larger opening movement deviation of the charge air duct blocking element (45) and/or the charge air duct blocking arrangement is further adapted to control the charge air duct blocking element (45) so as to assume, within the predefined movement characteristic, at least one predetermined partial opening interim rest position during the opening of the charge air duct blocking element (45).

5. The internal combustion engine (5) according to claim 1, wherein the charge air duct blocking arrangement (43) is provided with a hydraulic control arrangement for the charge air duct blocking element (45) and includes a hydraulic fluid flow throttling device (61) with a smaller hydraulic fluid flow cross section for the adjustment of a slow movement profile for opening the valve and a larger hydraulic fluid flow cross-section for the a fast movement profile for closing the charge air duct blocking element (45).

6. The internal combustion engine (5) according to claim 5, wherein the charge air duct blocking arrangement (43) includes the smaller hydraulic fluid flow cross-section in a hydraulic fluid flow connection (59) to a control cylinder (47) of the charge air blocking element (45) in the form of a throttling device (61) and the larger hydraulic flow cross-section in the form of a by-pass line (63) which by-passes the throttling device (61) and is provided with a check valve (65) permitting rapid closing of the charge air duct blocking arrangement (43).

7. The internal combustion engine (5) according to claim 6, wherein the charge air duct blocking arrangement (43) is adapted to conduct the hydraulic control fluid selectively via the smaller hydraulic fluid flow cross-section for the movement of the charge air blocking element (45) relatively slowly to an open position or via the larger hydraulic fluid flow cross-section for the adjustment of the movement profile providing for a rapid closing of the charge air blocking element (45).

8. The internal combustion engine (5) according to claim 1, wherein the charge air duct blocking arrangement (43) includes a valve (67) via which a hydraulic fluid flow from, or to, a control cylinder 47) for activating the charge air duct blocking element (45) can be controlled to be throttled for a slow opening of the charge air duct blocking element (45) and unthrottled for a fast closing of the charge air duct blocking element (45).

9. The internal combustion engine (5) according to claim 1, wherein the charge air duct blocking arrangement (43) includes an electrically operated controller (69) which is operatively connected to the charge air duct blocking element (45) for the opening and closing thereof and also connected to a control unit of the internal combustion air engine (5).

10. The internal combustion engine (5) according to claim 9, wherein the controller (69) is adapted to provide different opening speeds and positions of the charge air duct blocking element (45) during an opening procedure for an engine operating point dependent opening characteristic.

11. The internal combustion engine (5) according to claim 1, wherein the charge air duct blocking arrangement (43) includes a hydraulic control cylinder (47) which is operatively connected to the charge air duct blocking element (45) for the activation thereof, and the control cylinder (47) is provided with a proportional valve (73) and a travel distance measuring arrangement (75) which, in an operative association with the control cylinder (47), provides for a defined opening control of the charge air duct blocking element (45) with different opening speeds and positions, in particular an engine operating state-dependent opening characteristic, so as to avoid turbocharger pumping.

12. The internal combustion engine (5) according to claim 1, wherein the opening duration of the charge air duct blocking element (45) relative to the closing duration thereof is adjustable in the range of 5:1 to 20:1.

13. The internal combustion engine (5) according to claim 12, wherein the charge air duct blocking arrangement (43) is adapted to provide for a charge air duct blocking element opening characteristic with which the charge air duct blocking element (45) opens continuously moving steplessly or discontinuously over the whole opening travel distance.

\* \* \* \* \*